US011503804B1

(12) United States Patent
MacPherson

(10) Patent No.: US 11,503,804 B1
(45) Date of Patent: Nov. 22, 2022

(54) ANIMAL PAW WASHING DEVICE

(71) Applicant: Katherine L. MacPherson, Regina (CA)

(72) Inventor: Katherine L. MacPherson, Regina (CA)

(\*) Notice: Subject to any disclaimer, the term of this patent is extended or adjusted under 35 U.S.C. 154(b) by 401 days.

(21) Appl. No.: 16/676,633

(22) Filed: Nov. 7, 2019

Related U.S. Application Data

(60) Provisional application No. 62/790,154, filed on Jan. 9, 2019.

(51) Int. Cl.
*A01K 13/00* (2006.01)
*A46B 13/02* (2006.01)
*F16H 1/36* (2006.01)

(52) U.S. Cl.
CPC ............ *A01K 13/001* (2013.01); *A46B 13/02* (2013.01); *A46B 2200/1093* (2013.01); *F16H 1/36* (2013.01)

(58) Field of Classification Search
None
See application file for complete search history.

(56) References Cited

U.S. PATENT DOCUMENTS

| 2,104,272 | A | * | 1/1938 | Partridge | ............ A47L 15/0068 15/76 |
| 2,255,081 | A | * | 9/1941 | Nielsen | ............... A47L 15/0068 15/76 |
| 3,781,939 | A | * | 1/1974 | Qualheim | ........... A47L 15/0068 15/76 |
| 4,011,621 | A | * | 3/1977 | Irvine | ................. A47L 15/0068 15/164 |
| 6,065,431 | A | * | 5/2000 | Davis | .................... A01K 13/001 119/600 |
| 6,745,721 | B1 | * | 6/2004 | Hammer | ............... A01K 13/001 119/664 |
| 6,851,391 | B1 | | 2/2005 | Mulich et al. | |
| D665,953 | S | | 8/2012 | Leary et al. | |
| 8,371,247 | B2 | | 2/2013 | Fleming | |
| 8,474,408 | B2 | | 7/2013 | Leary et al. | |
| 9,326,485 | B2 | | 5/2016 | Plummer | |
| 9,414,570 | B2 | * | 8/2016 | Surmeli | ............... A01K 13/002 |
| D799,126 | S | | 10/2017 | Shamoon | |
| 2005/0011467 | A1 | | 1/2005 | Mulich et al. | |
| 2005/0211270 | A1 | * | 9/2005 | Wheelwright | ....... A01K 13/001 15/97.1 |

(Continued)

FOREIGN PATENT DOCUMENTS

CN 105557542 A * 5/2016
CN 108174796 A * 6/2018 ........... A01K 13/001

(Continued)

*Primary Examiner* — Peter M Poon
*Assistant Examiner* — Morgan T Jordan
(74) *Attorney, Agent, or Firm* — Cramer Patent & Design, PLLC; Aaron R. Cramer

(57) ABSTRACT

An automatic animal paw washing machine includes a container having a flexible cover and opening at an open end thereof and a plurality of brushes secured therewithin. The brushes are in mechanical communication with a mechanism capable of being activated by a switch. The plurality of brushes is motioned in a rotating fashion when activated. The flexible cover is capable of being removed from the washing machine.

20 Claims, 4 Drawing Sheets

(56) References Cited

U.S. PATENT DOCUMENTS

| | | | |
|---|---|---|---|
| 2006/0185616 A1* | 8/2006 | Leary | A01K 13/001 |
| | | | 119/673 |
| 2012/0260864 A1* | 10/2012 | Jonsson | A63B 57/60 |
| | | | 119/609 |
| 2014/0326193 A1 | 11/2014 | Plummer | |
| 2014/0352629 A1 | 12/2014 | Surmeli et al. | |
| 2016/0100551 A1 | 4/2016 | Hanneken | |
| 2017/0000084 A1 | 1/2017 | Joyner | |
| 2018/0255747 A1* | 9/2018 | Barthle | B08B 1/002 |

FOREIGN PATENT DOCUMENTS

| | | | | |
|---|---|---|---|---|
| CN | 110036936 A | * | 7/2019 | |
| DE | 20212476 U1 | * | 2/2004 | A01K 13/001 |
| KR | 101201802 B1 | * | 11/2012 | |
| WO | WO-2013028139 A1 | * | 2/2013 | A01K 13/001 |

\* cited by examiner

ANIMAL PAW WASHING DEVICE

RELATED APPLICATIONS

This application claims the benefit of U.S. Provisional Application No. 62/790,154, which was filed Jan. 9, 2019, the entire disclosures of which are incorporated herein by reference.

FIELD OF THE INVENTION

The present invention relates generally to an animal paw washing device.

BACKGROUND OF THE INVENTION

Cleaning your pet's paws has never been a fun or easy task. Usually, the pet is unwilling to engage in bathing or be subject to gentle scrubbing with a towel soap and water. And yet, this activity is very important in as much as dirty pet paws may be unhealthy for the pet and cause unintended messes within the house. Accordingly, there exists a need for an animal paw washing device which effectively cleans the pet's paws in a manner that is safe, easy and effective.

SUMMARY OF THE INVENTION

The inventor has recognized the aforementioned inherent problems and observed that there is a need for an animal paw washing machine, comprising a rotating mechanism which selectively moves; a portion of the animal paw washing machine that includes a plurality of brushes that contact at least a portion of an animal's paw and an animal's appendage to provide a cleaning motion. The animal paw washing machine also comprises a base having an open top. The base houses the rotating mechanism. The animal paw washing machine also comprises a sidewall upstanding from an upper perimeter edge of the base. The sidewall is cylindrical and has a lower circumferential edge sealed thereto and provides a waterproof seal from the interior to the external environment. The paw washing machine also comprises a lid covering the open top of the sidewall. The lid has an open bottom. The outer diameter of the lid is greater than the outer diameter of the outer circumference of the sidewall. There is also a drain hole located along a side of the sidewall of the base and is in fluid communication with an external environment through an upper surface of the base and the interior. The animal paw washing machine also comprises a center pad located at a center of the upper portion of the base, the base is rigidly fixed thereto. There is a rotating ring which surrounds the center pad and fills a distance between an inner circumferential edge of the sidewall of the base and an outer circumferential edge of the center pad.

The animal washing machine also comprises a slot formed along a portion of the sidewall of the base to accommodate an actuating linkage. A first end of the actuating linkage is operably attached to the rotating mechanism within the base and a second end of the actuating linkage resides outside of the slot and terminates in a handle, movement of the handle in an arcuate path is limited by the opposing edges of the slot and movement of the handle in an arcuate path operably controls the rotating mechanism and hence the rotating ring. The animal washing machine also comprises a plurality of rods affixed to the upper surface of the rotating ring and simultaneously travel therewith.

Each of the brushes may be affixed or removably attached to each individual rod. Each of the brushes are fixed to the rod or rotate relative thereto. The brushes may be located above the rotating ring and surrounded by the base. In at least a portion of the outermost circumference of each of the brushes extends into a vertical space of the interior directly above the center pad to ensure that the paw and the appendage of the animal that is placed within the interior of the animal paw washing machine is contacted by a portion of each of the brushes as the four brushes are arranged in a symmetrical pattern about an area of cleaning contact about the animal's paw.

The handle may be connected to an arm which is subsequently firmly affixed to an outer ring gear. The handle moves along an arcuate travel path as limited by the slot in a back-and-forth manner. As the outer ring gear is rotated, motion is imparted to four planetary gears as secured by the four rods and as such, as the rods turn, and motion is imparted to each of the brushes. A centering gear used to add stability to the gear assembly that includes the four planetary gears and the outer ring gear.

The rotating mechanism may function as a weighted portion. The base is a small, squat cylinder with a weighted portion which enables the animal paw washing machine to be secure on a support surface upon which it is placed. The sidewall may be translucent so as to view the rotating ring operate and ensure proper positioning of the paw of the animal. The sidewall may also be transparent so as to view the rotating ring operate and ensure proper positioning of the paw of the animal. The lid may be manufactured out of silicone that is providing a water-tight seal around an edge of the sidewall when attached to the sidewall. The lid may enable partial deformity when the animal paw and the appendage is forced therethrough and enables the lobes to spring back and conform to the outer surface of the appendage of the animal to provide resistance to release of a cleaning solution or water from the animal paw washing machine particularly during operation.

The drain hole may be sealed with a removable plug. The upper surface of the center pad may be deformable. The upper surface of the center pad may be cushioning. The handle may be bulbous in shape or ergonomically shaped. The rods may be equidistantly spaced in a radial fashion along a common bisecting radial centerline. The brushes may be intended to be soft and non-abrasive so as to not harm the animal. Four of the brushes may be arranged in a symmetrical pattern about an area of cleaning contact about the animal's paw. The four brushes may move in a manner selected from the group consisting of a clockwise manner, a counterclockwise manner, or any independent manner. The animal paw washing machine washes the paw of the animal. The animal may be a cat or a dog. The animal paw washing machine may retain an amount of water or cleaning solution within the interior along with the animal's paw and a portion of the animal's appendage to clean the animal's paw and a portion of the animal's appendage.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
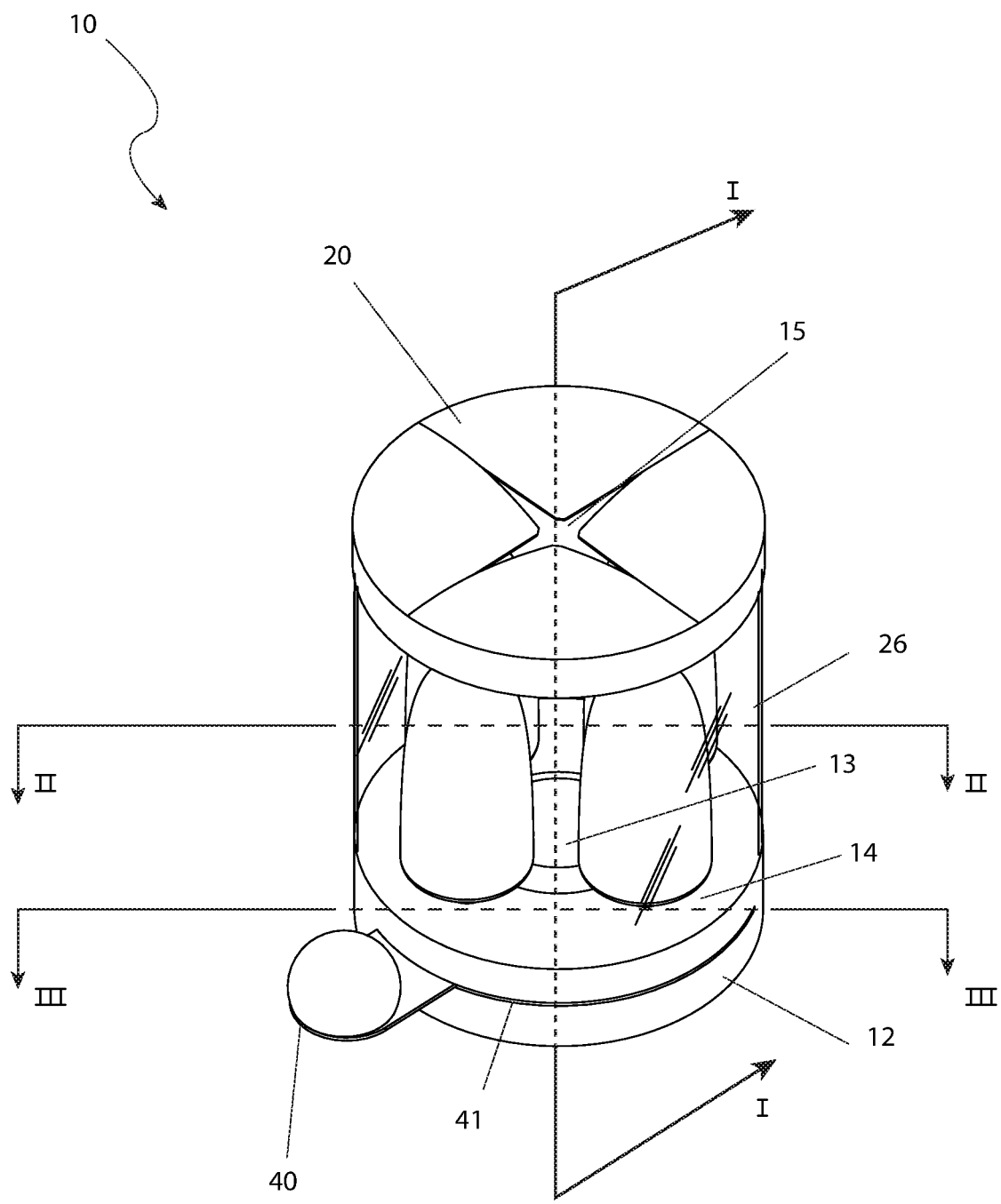
FIG. 1 is a top perspective view of an animal paw washing machine 10, according to the preferred embodiment of the present invention.

DESCRIPTIVE KEY 10 animal paw washing machine
11 drain hole
12 base
13 center pad
14 rotating ring
15 opening
20 lid
25 interior
26 sidewall
30 rod
35 brush
40 handle
41 slot
50 area of cleaning contact
55 arm
60 outer ring gear
65 arcuate travel path "a"
70 planetary gear
75 centering gear

1. DESCRIPTION OF THE INVENTION

The best mode for carrying out the invention is presented in terms of its preferred embodiment, herein depicted within FIG. 1. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. DETAILED DESCRIPTION OF THE FIGURES

Referring now to FIG. 1, there is depicted a top perspective view of an animal paw washing device (herein described as the "device") 10. The device 10 is particularly suited for washing an individual paw of an animal, such as a pet dog or cat. The device 10 is capable of retaining an amount of water or a cleaning solution within an interior 25 along with the animal's paw and a portion of the animal's appendage. A rotating mechanism selectively moves; a portion of the device 10 that has brushes 35 capable of contacting at least a portion of the animal's paw and appendage to provide a cleaning motion. The device comprises a base 12 that houses the rotating mechanism, a transparent or translucent sidewall 26 upstanding from an upper perimeter edge of the base 12 and having an open top, and a lid 20 covering the open top of the sidewall 26.

The base 12 is preferably a small, squat cylinder with a weighted portion to enable the device 10 to be secure on a support surface upon which it is placed. The rotating mechanism can function as the weighted portion, or another anchoring means can be utilized. A drain hole is located along a side of the sidewall of the base 12 and is in fluid communication with the environment through the upper surface of the base 12 (and hence the interior 25 when the device 12 is fully assembled). The drain hole 11 can be sealed with a removable plug.

A center pad 13 is located at the center of the upper portion of the base 12 and is rigidly fixed thereto. The upper surface of the center pad 13 is relative deformable or cushioning. A rotating ring 14 surrounds the center pad 13 and fills the distance between the inner circumferential edge of the sidewall of the base 12 and the outer circumferential edge of the center pad 13. The bottom surface of the rotating ring 14 is in operable communication with the rotating mechanism (see FIG. 3). Operation of the rotating mechanism transfers rotational movement to the rotating ring 14 relative to the stationary sidewall and bottom of the base 12 and to the center pad 13.

A slot 41 is formed along a portion of the sidewall of the base 12 to accommodate an actuating linkage. A first end of the actuating linkage is operably attached to the rotating mechanism within the base 12. A second end of the actuating linkage resides outside of the slot 41 and terminates in a handle 40, preferably bulbous or otherwise ergonomic in shape. Movement of the handle 40 in an arcuate path is limited by the opposing edges of the slot 41. Movement of the handle 40 in an arcuate path operably controls the rotating mechanism and hence the rotating ring 14. It is preferred that the mechanism of the rotating ring 14, rotating mechanism, actuating linkage, and handle 40 mimics a salad spinner, such as in the use of planetary gears. Other systems of the rotating mechanism are appreciated as enabling actuation of the handle 40 to impart a rotational movement to the rotating ring 14.

Figure 2:
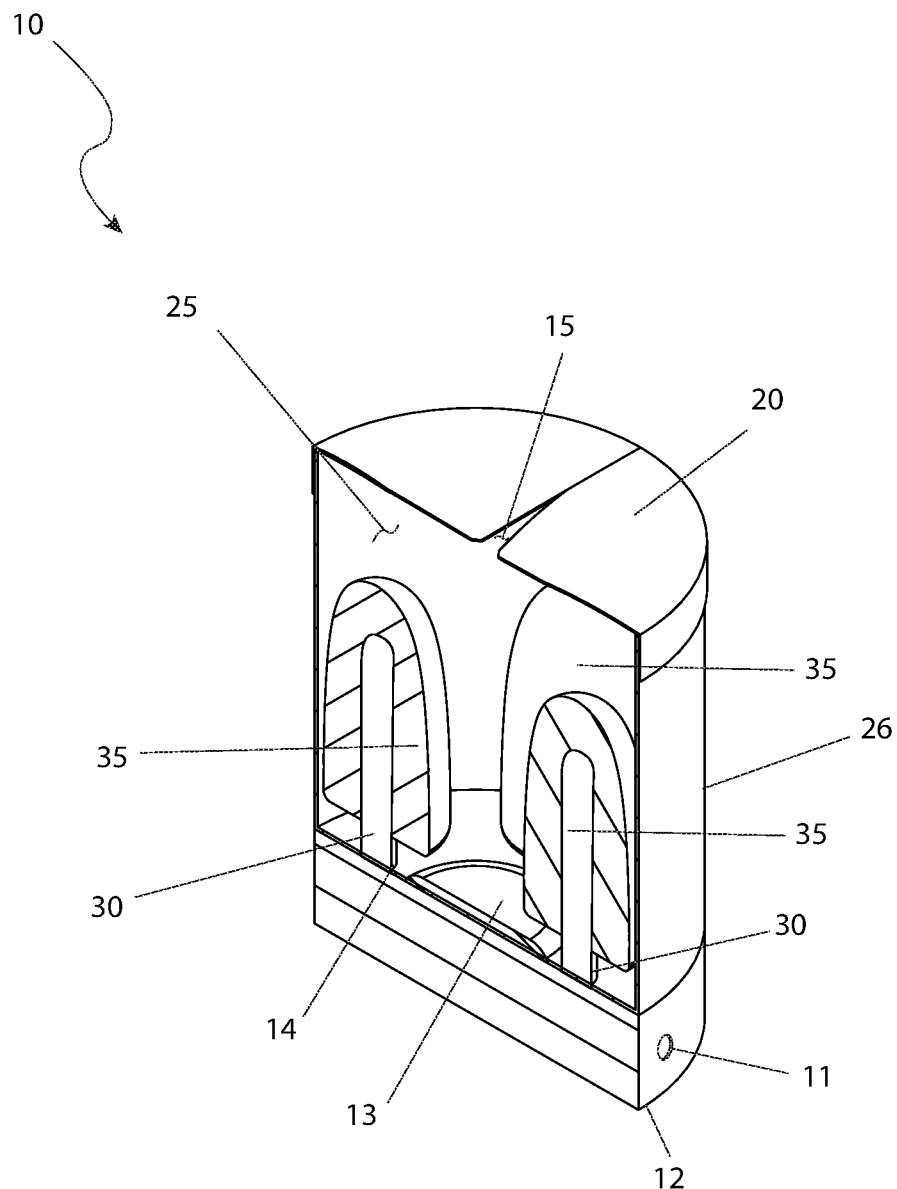
FIG. 2 is a cut-away view along the line I-I (see FIG. 1) of the animal paw washing machine 10, according to the preferred embodiment of the present invention.

Referring now to FIG. 2, which depicts a cut-away view of the device 10. The sidewall 26 is cylindrical similar to the diameter of the base 12 and has a lower circumferential edge sealed thereto. Such a seal provides a waterproof seal from the interior 25 to the environment at that location. The sidewall 26 is preferably transparent so as to view the rotating ring 14 operate and the proper positioning of the paw of the animal. A plurality of rods 30 are affixed to the upper surface of the rotating ring 14 and simultaneously travel therewith. It is preferred that the rods 30 are equidistantly spaced in a radial fashion along a common bisecting radial centerline. Affixed or removably attached to each individual rod 30 is a brush 35. The brush 35 can be fixed to the rod 30 or rotate relative thereto. It is preferred that at least a portion of the outermost circumference of each brush 30 extends into a vertical space of the interior 25 directly above the center pad 13. This is to ensure that the paw and appendage of the animal that is placed within the interior 25 of the device 10 is contacted by a portion of the brush 35. The brushes 35 are intended to be soft and non-abrasive so as to not harm the animal.

The lid 20 has a similar cylindrical overall shape as the base, but with an open bottom. The outer diameter of the lid 20 is greater than the outer diameter of the outer circumference of the sidewall 26. The lid 20 is preferably manufactured out of silicone or other conformable material that aid is providing a water-tight seal around the edge when attached to the sidewall 26. The bottom of the lid 20 has a continual apron that depends slightly downward. The lid 20 further has an opening 15 at the center location, shaped in a cross to form four (4) lobes. The material of the lid 20 enables partial deformity when an animal paw and appendage is forced therethrough and enables the lobes to spring back and conform to the outer surface of the appendage of the animal to provide resistance to release of the cleaning solution or water from the device 10, particularly during operation.

Figure 3:
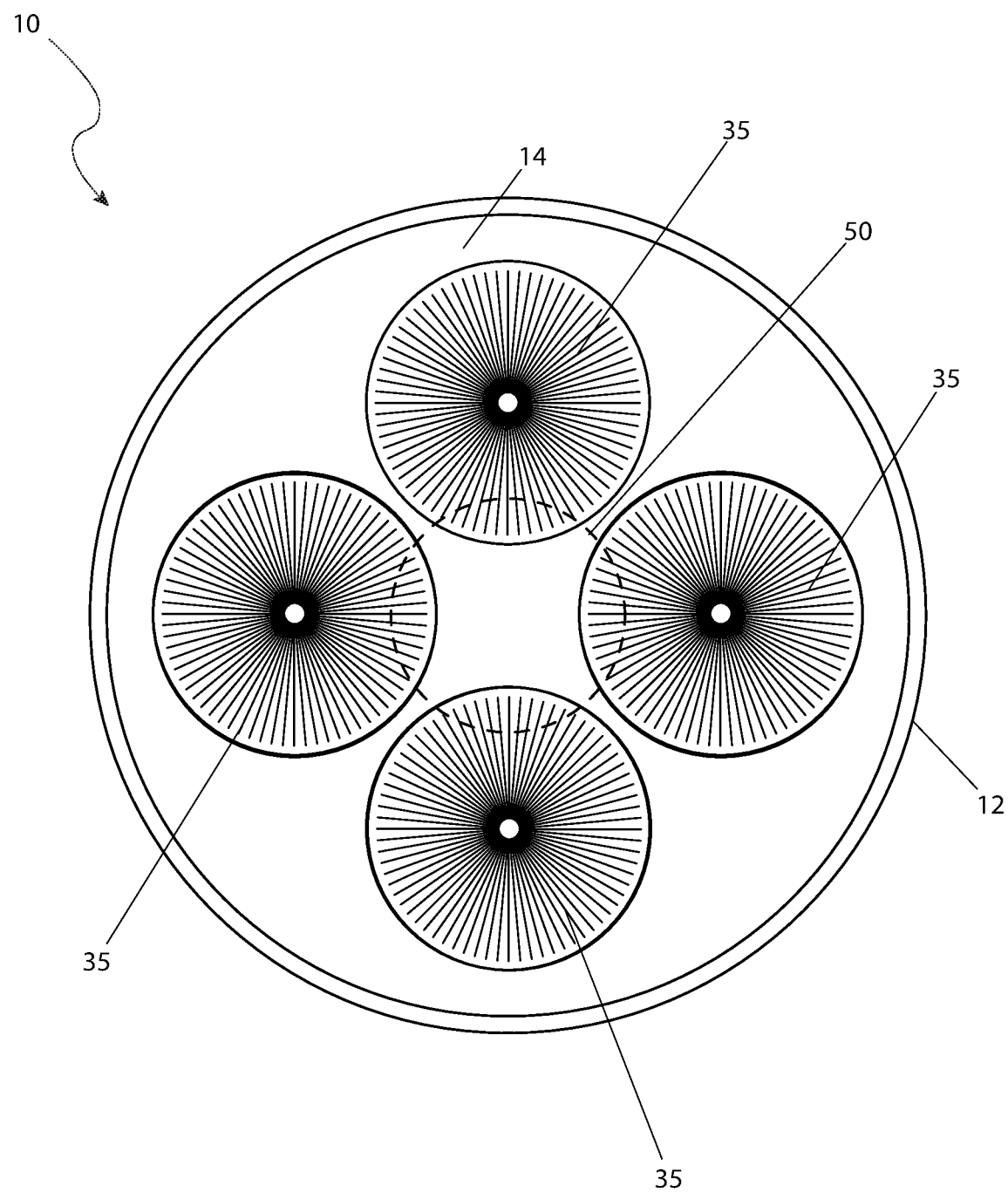
FIG. 3 is a cut-away view along the line II-II (see FIG. 1) of the animal paw washing machine 10, according to the preferred embodiment of the present invention.

Referring next to FIG. 3, a cut-away view along the line II-II (see FIG. 1) of the animal paw washing machine 10, according to the preferred embodiment of the present invention is disclosed. This view provides clarification on the four (4) brushes 35 as they are arranged in a symmetrical pattern about an area of cleaning contact 50 about the animal's paw. The four (4) brushes 35 may all move in a clockwise manner, a counterclockwise manner, or any independent manner thereof. The brushes 35 are located above the rotating ring 14 and surrounded by the base 12.

Figure 4:
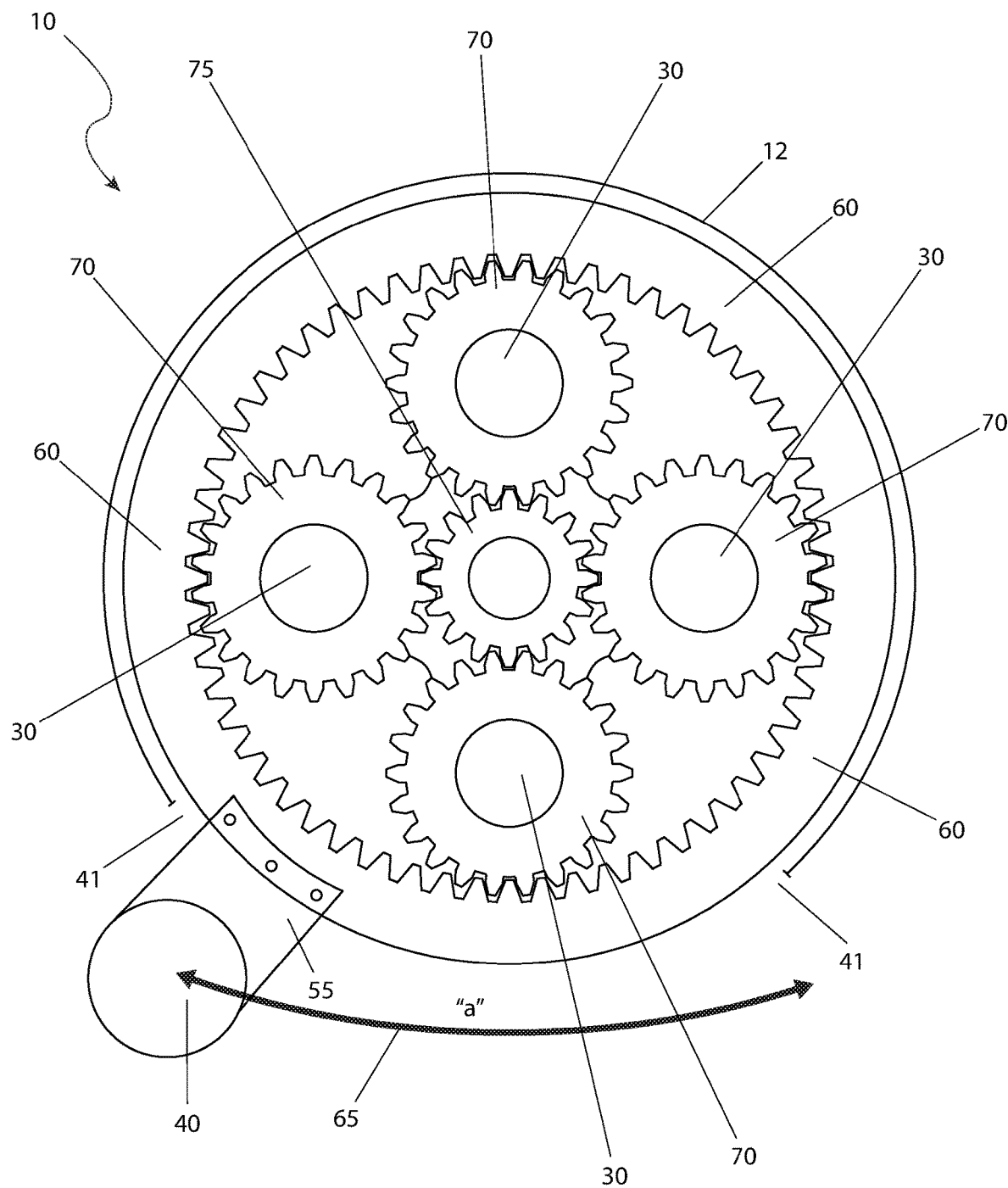
FIG. 4 is a cut-away view along the line III-III (see FIG. 1) of the animal paw washing machine 10, according to the preferred embodiment of the present invention.

Referring to FIG. 4, a cut-away view along the line III-III (see FIG. 1) of the animal paw washing machine 10, according to the preferred embodiment of the present invention is depicted. This view provides an example of possible inner-workings of the rotating mechanism as contained within the base 12. The handle 40 is connected to an arm 55 which is subsequently firmly affixed to an outer ring gear 60. The handle moves along an arcuate travel path "a" 65 as limited by the slot 41 in a back-and-forth manner. As the outer ring gear 60 is rotated, motion is imparted to four (4) planetary gears 70 as secured by the four (4) rods 30. As such, as the rods 30 turn, motion is imparted to the brushes 35 (as shown in FIGS. 1, 2 and 3). A centering gear 75 may be used to add stability to the gear assembly consisting of the four (4) planetary gears 70 and the outer ring gear 60.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. various embodiments with various modifications as are suited to the particular use contemplated.

What is claimed is:

1. An animal paw washing machine, comprising:
   a base having an open top;
   a sidewall upstanding from an upper perimeter edge of the base, the sidewall is cylindrical and provides a waterproof seal from an interior to an external environment;
   a lid covering an open top of the sidewall;
   a drain hole located along a side of the sidewall and is in fluid communication with the external environment through an upper surface of the base and the interior;
   a center pad located at a center of an upper portion of the base, the base is rigidly fixed thereto;
   a rotating ring surrounding the center pad;
   a slot formed along a portion of the sidewall of the base to accommodate an actuating linkage, a second end of the actuating linkage resides outside of the slot and terminates in a handle, and movement of the handle in an arcuate path is limited by the opposing edges of the slot;
   a plurality of rods affixed to an upper surface of the rotating ring and simultaneously travel therewith;
   wherein each of four brushes are affixed or removably attached to each individual rod, each of the brushes are fixed to the rod or rotate relative thereto, the brushes are located above the rotating ring and surrounded by the base, wherein in at least a portion of the outermost circumference of each of the brushes extends into a vertical space of the interior directly above the center pad to ensure that the paw and the appendage of the animal that is placed within the interior of the animal paw washing machine is contacted by a portion of each of the brushes as the four brushes are arranged in a symmetrical pattern about an area of cleaning contact about the animal's paw;
   wherein the handle is connected to an arm which is subsequently firmly affixed to an outer ring gear, the handle moves along an arcuate travel path as limited by the slot in a back-and-forth manner, as the outer ring gear is rotated, motion is imparted to four planetary gears as secured by the four rods and as such, as the rods turn, and motion is imparted to each of the brushes; and
   a centering gear used to add stability to a gear assembly that includes the four planetary gears and the outer ring gear.

2. The animal paw washing machine according to claim 1, wherein the rotating mechanism functions as a weighted portion.

3. The animal paw washing machine according to claim 1, wherein the base is a small, squat cylinder with a weighted portion to enable the animal paw washing machine to be secure on a support surface upon which it is placed.

4. The animal paw washing machine according to claim 1, wherein the sidewall is translucent so as to view the rotating ring operate and ensure proper positioning of the paw of the animal.

5. The animal paw washing machine according to claim 1, wherein the sidewall is transparent so as to view the rotating ring operate and ensure proper positioning of the paw of the animal.

6. The animal paw washing machine according to claim 1, wherein the lid is manufactured out of silicone that is providing the water-tight seal around an edge of the sidewall when attached to the sidewall.

7. The animal paw washing machine according to claim 1, wherein the lid further comprises lobes such that the lid enables partial deformity when the animal paw and the appendage is forced therethrough and enables the lobes to spring back and conform to the outer surface of the appendage of the animal to provide resistance to release of a cleaning solution or water from the animal paw washing machine particularly during operation.

8. The animal paw washing machine according to claim 7, wherein the drain hole is sealed with a removable plug.

9. The animal paw washing machine according to claim 1, wherein the upper surface of the center pad is deformable.

10. The animal paw washing machine according to claim 1, wherein the upper surface of the center pad is cushioning.

11. The animal paw washing machine according to claim 1, wherein the handle is bulbous in shape.

12. The animal paw washing machine according to claim 1, wherein the handle is ergonomically shaped.

13. The animal paw washing machine according to claim 1, wherein the rods are equidistantly spaced in a radial fashion along a common bisecting radial centerline.

14. The animal paw washing machine according to claim 1, wherein each of the brushes are soft and non-abrasive.

15. The animal paw washing machine according to claim 1, wherein the four brushes are arranged in a symmetrical pattern about an area of cleaning contact about the animal's paw.

16. The animal paw washing machine according to claim 15, wherein the four brushes move in a manner selected from the group consisting of a clockwise manner, a counterclockwise manner, or any independent manner.

17. The animal paw washing machine according to claim 1, wherein the animal paw washing machine washes the paw of the animal.

18. The animal paw washing machine according to claim 1, wherein the animal is a cat.

19. The animal paw washing machine according to claim 1, wherein the animal is a dog.

20. The animal paw washing machine according to claim 1, wherein the animal paw washing machine retains an amount of water or cleaning solution within the interior along with the animal's paw and a portion of the animal's appendage to clean the animal's paw and a portion of the animal's appendage.

* * * * *